(12) United States Patent
Manish et al.

(10) Patent No.: US 8,378,003 B2
(45) Date of Patent: Feb. 19, 2013

(54) HIGHLY PERMEABLE POLYMERIC MEMBRANES

(75) Inventors: Kumar Manish, Newton, MA (US); Clark Mark, Chicago, IL (US); Zilles L. Julie, Champaign, IL (US); Mariusz Grzelakowski, Marina Del Rey, CA (US); Rainer Nehring, Basel (CH); WolfGang Meier, Therwil (CH)

(73) Assignee: The Board of Trustees of the University of Illinois, Urbana, IL (US)

( * ) Notice: Subject to any disclaimer, the term of this patent is extended or adjusted under 35 U.S.C. 154(b) by 96 days.

(21) Appl. No.: 12/745,692

(22) PCT Filed: Dec. 4, 2008

(86) PCT No.: PCT/US2008/085563
§ 371 (c)(1),
(2), (4) Date: Oct. 26, 2010

(87) PCT Pub. No.: WO2009/076174
PCT Pub. Date: Jun. 18, 2009

(65) Prior Publication Data
US 2011/0046074 A1    Feb. 24, 2011

Related U.S. Application Data

(60) Provisional application No. 60/992,660, filed on Dec. 5, 2007.

(51) Int. Cl.
    C08F 2/46    (2006.01)
    C08F 2/42    (2006.01)
    C08J 3/28    (2006.01)
    B01D 39/14   (2006.01)

(52) U.S. Cl. ............... 522/88; 522/84; 522/85; 522/86; 522/87; 522/89; 522/148; 522/151; 522/172; 522/173; 210/500.1; 210/500.21; 210/500.27; 210/500.28; 526/279; 526/303.1; 526/297; 526/291; 526/317.1; 526/318; 526/308; 526/307.4; 526/318.25; 526/318.41

(58) Field of Classification Search .......... 210/500.1, 210/500.21, 500.27, 500.28; 526/279, 303.1, 526/297, 291, 317.1, 10, 308, 307.4, 318, 526/318.25, 318.41; 522/84, 86, 87, 88, 522/91, 148, 151, 150, 152, 172, 173
See application file for complete search history.

(56) References Cited

U.S. PATENT DOCUMENTS

| | | | |
|---|---|---|---|
| 5,238,613 A | 8/1993 | Anderson | |
| 6,413,621 B1 | 7/2002 | Mayes | |
| 6,723,814 B2* | 4/2004 | Meier et al. | 526/279 |
| 7,208,089 B2 | 4/2007 | Montemagno | |
| 2001/0034432 A1* | 10/2001 | Sodroski et al. | 530/350 |
| 2002/0182717 A1* | 12/2002 | Karlsson | 435/287.2 |
| 2004/0049230 A1* | 3/2004 | Montemagno et al. | 607/1 |
| 2004/0180147 A1* | 9/2004 | Parikh et al. | 427/558 |

* cited by examiner

*Primary Examiner* — Sanza McClendon
(74) *Attorney, Agent, or Firm* — Guntin & Gust, PLC; Ed Guntin (57) ABSTRACT

Provided are substantially flat membranes that include a block or graft co-polymer and a water transport protein, such as Aquaporin-Z, or a synthetic mimic of such proteins. Also provided are methods of removing contaminants from a liquid, by contacting the liquid with a substantially flat membrane that includes a block or graft co-polymer and a water transport protein or synthetic mimic thereof. Also provided are methods of making such membranes. Further provided are compositions that include at least one active ingredient and vesicles surrounding the active ingredient, where the vesicles include a block or graft copolymer and a water transport protein or synthetic mimic surrounding the active ingredient. Also provided are methods that include administering such compositions to patients.

14 Claims, 6 Drawing Sheets

HIGHLY PERMEABLE POLYMERIC MEMBRANES

CROSS-REFERENCE TO RELATED APPLICATIONS

This application is a National Stage entry under 35 U.S.C. 371 based on PCT/US08/85563 filed Dec. 4, 2008, which claimed the benefit of U.S. Provisional Application No. 60/992,660 filed Dec. 5, 2007 by Kumar et al., entitled "HIGHLY PERMEABLE POLYMERIC MEMBRANES". All aspects of PCT/US08/85563 are hereby incorporated by reference.

STATEMENT AS TO FEDERALLY SPONSORED RESEARCH

The subject matter of this application was funded in part under National Science Foundation Federal research grant number CBET-0828512. The U.S. Government may have certain rights in this invention.

FIELD

The present disclosure relates generally to substantially flat membranes that include a triblock amphiphilic block or graft co-polymer and a water transport protein, such as Aquaporins or their synthetic mimics. The disclosure also relates to methods of treating a liquid, for example removing contaminants from a liquid, by contacting the liquid with a substantially flat membrane that includes a block co-polymer and a water transport protein or its synthetic mimic. Also provided are methods of making such membranes and novel polymers that may be used in such methods. Further provided are compositions that include at least one active ingredient and vesicles surrounding the active ingredient, where the vesicles include a block or graft copolymer and a water transport protein or synthetic mimic surrounding the active ingredient. Also provided are methods that include administering such compositions to patients.

BACKGROUND

Biological membranes have excellent water transport characteristics, with certain membranes able to control permeability over a wide range. Membranes such as those present in the proximal tubules of the human kidney can be induced to insert specific water channel membrane proteins known as Aquaporins (AQPs) to increase permeability. (Knepper, M. A.; et al., "Renal Aquaporins," *Kidney Int* 1996, 49, (6), 1712-7). Other biological membranes, such as those in mammalian optic lenses, erythrocytes, and other cell membranes, are constitutively AQP rich. (Gorin, M. B.; et al., "The major intrinsic protein (MIP) of the bovine lens fiber membrane: Characterization and structure based on cDNA cloning," *Cell* 1984, 39, (1), 49-59). Permeabilities observed in AQP-rich membranes are orders of magnitude higher than those observed for unmodified phospholipid membranes (Borgnia, M. J.; et al., "Functional reconstitution and characterization of AqpZ, the *E-coli* water channel protein," *Journal of Molecular Biology* 1999, 291, (5), 1169-1179).

Additionally, some members of the AQP family have excellent solute retention capabilities for very small solutes such as urea, glycerol and glucose even at high water transport rates (Borgnia, et al. (1999); Meinild, A. K.; et al., "Bidirectional water fluxes and specificity for small hydrophilic molecules in aquaporins 0-5," *Journal of Biological Chemistry* 1998, 273, (49), 32446-32451). These properties result from the unique structure of the water-selective AQPs. AQPs have six membrane-spanning domains and a unique hourglass structure (Jung, J. S.; et al., "Molecular structure of the water channel through aquaporin CHIP. The hourglass model," *J Biol Chem* 1994, 269, (20), 14648-54) with conserved charged residues that form a pore that allows the selective transport of water while rejecting solutes.

The effects of AQPs on the permeability of biological and synthetic lipid membranes has been studied by incorporating these proteins into liposomes (Borgnia, et al. (1999)), frog oocytes (Preston, G. M.; et al., "Appearance of Water Channels in *Xenopus* Oocytes Expressing Red-Cell Chip28 Protein," *Science* 1992, 256, (5055), 385-387) and cellular secretory vesicles (Coury, L. A.; et al., "Use of yeast secretory (sec) vesicles to express and characterize aquaporin (AQP) 1 and 2 water channels," *Journal of the American Society of Nephrology* 1996, 7, (9), A0088-A0088). However, the direct use of biological membranes or synthesized lipid membranes for water treatment and drug delivery applications has practical disadvantages. The major limitation is the low stability of lipid membranes. (Duncan, R., "The dawning era of polymer therapeutics," *Nat Rev Drug Discov* 2003, 2, (5), 347-60). Obtaining and processing large volumes of such membranes would also present technical challenges.

BRIEF DESCRIPTION OF THE DRAWINGS

Illustrative embodiments of the present disclosure are herein described, by way of non-limiting example, with reference to the following accompanying Figures:

FIG. 3(a) is a cryogenic transmission electron micrograph of an ABA polymer vesicle. FIG. 3(b) is an electron micrograph of a cluster of vesicles. FIG. 3(c) is an atomic force micrograph of vesicles on mica in non-tapping mode.

FIG. 4(a) depicts an increase in relative light scattering with and without reconstituted Aquaporin Z ("AqpZ") into an ABA polymer. FIG. 4(b) shows the rise in scattering between 2 and 10 seconds for the polymer that was used in calculating permeability at 5.5° C.

FIG. 6(a) depicts light scattering results normalized to fit between 0 and 1. FIG. 6(b) shows an increase in calculated permeability with increase in protein to polymer ratio.

DETAILED DESCRIPTION

Desalination is becoming increasingly important for water production in semi-arid coastal regions as well as for wastewater recycling. Reverse Osmosis (RO) membranes are most commonly used for this application and the use of Forward Osmosis (FO) membranes is creating substantial interest. However, reverse osmosis requires large consumption of energy while forward osmosis applications need large membrane areas. This is due to the low productivity of currently used commercial RO and FO membranes.

Example embodiments herein provide a significant improvement in the permeability of solute rejecting membranes, which may be a large step in improving the economics of desalination for e.g., municipal applications. Large improvements in the efficiency of water treatment membranes may result from the development of biomimetic membranes with high permeability and selectivity. Membranes or films provided herein may provide a large increase in productivity so the process of e.g. water treatment may be much more efficient with more productive membranes. Equipment size (pumps, modules, etc) can also be reduced. Additionally, a flat membrane according to example embodiments, may allow the membrane to be retrofitted into existing treatment schemes by simply replacing old membranes with new membranes.

Non-limiting illustrative embodiments of the present disclosure include substantially flat membranes or films that include a block co-polymer and water transport proteins such as Aquaporin-Z, or their synthetic mimics. Further embodiments are directed to methods of making such membranes or films. Example embodiments also include methods of treating liquids such as water, by using the membranes or films disclosed herein to remove contaminants from the liquid. Example embodiments are also directed to compositions that include at least one active ingredient and vesicles surrounding the active ingredient, where the vesicles include a block or graft copolymer and a water transport protein or synthetic mimic surrounding the active ingredient. Further example embodiments are directed to methods that include administering such compositions to patients.

The aspects, advantages and/or other features of example embodiments of the present disclosure will become apparent in view of the following detailed description, taken in conjunction with the accompanying drawings. It should be apparent to those skilled in the art that the described embodiments of the present disclosure provided herein are merely exemplary and illustrative and not limiting. Numerous embodiments of modifications thereof are contemplated as falling within the scope of the present disclosure and equivalents thereto. All publications, patent applications, patents, and other references mentioned herein are incorporated by reference in their entirety.

In describing example embodiments, specific terminology is employed for the sake of clarity. However, the embodiments are not intended to be limited to this specific terminology.

As used herein, "a" or "an" may mean one or more. As used herein, "another" may mean at least a second or more.

Non-limiting illustrative embodiments include composite membranes or films that include block co-polymers, such as a triblock amphiphilic block or graft co-polymer, and water transport proteins or synthetic mimics thereof, where the membrane has a substantially flat configuration. The area of the membranes herein is not limited. The depth of the membranes can be between 3 and 50 nanometers. Example membranes can be supported. A support may be for example, a polymeric commercial membrane. Non-limiting example embodiments include membranes comprising a triblock or a graft ABA copolymer, where the membrane has a substantially flat configuration.

Examples of block co-polymers may include a triblock ABA copolymer, such as crosslinkable ABA block or graft polymers. The ABA polymers may include methacrylate end groups. A number of triblock copolymers could be used for this application. Non-limiting examples of block copolymers that may be used in example membranes or films may include poly(2-methyloxazoline)-block-poly(dimethylsiloxane)-block-poly(2-methyloxazoline) (PMOXA-PDMS-PMOXA) block polymers, such as $PMOXA_{15}$-$PDMS_{110}$-$PMOXA_{15}$. Non-limiting examples of block copolymers that may be used in accordance herewith may include e.g., those disclosed in U.S. Pat. No. 6,916,488, which is incorporated herein by reference.

Non-limiting examples of water transport proteins may include Aquaporins, such as Aquaporin-Z or their synthetic mimics. Synthetic mimics are synthetic channels that may mimic the aquaporin in terms of structure and function. Specific examples include, but are not limited to carbon nanotubes and polymeric helical channels created by Percerc et al. (Percec et al, Nature, Volume 430, Issue 7001, pp. 764-768 (2004); see also, U.S. Patent Publication No. 2006-0088499-A1 (Apr. 27, 2006), which are hereby incorporated by reference).

The term "Aqp" as used herein may be for example, a bacterial Aquaporin from *Escherichia coli*—Aquaporin Z (AqpZ). AqpZ may be particularly useful in that it may enhance the permeability of lipid vesicles while retaining small uncharged solutes. Additionally, AqpZ can be expressed in relatively large quantities in *E. coli* and may remain stable under different reducing conditions and at temperatures of 4° C. for extended periods of time. In example embodiments, the AqpZ may be labeled with histidine tags. Accordingly, example embodiments may include recombinant Aquaporin-Z having histidine tags thereon. AQP's high permeability, high specificity, and excellent solute retention could be very valuable for a variety of applications, including for water treatment or drug delivery. Another application may include dialysis, as the use of AqpZ could lead to reduced equipment size and more efficient use of energy.

In embodiments in which the present membranes are used for drug delivery, vesicles made of triblock copolymers and with inserted AqpZ (or other water transport protein or synthetic mimic) may be filled with a high osmotic pressure mixture with a drug (higher than physiological solution osmotic pressure). When these vesicles are introduced into the body the vesicles may open up to deliver the drug. Accordingly, provided herein are compositions that include at least one active ingredient or drug, and vesicles essentially surrounding the active ingredient, where the vesicles include a block copolymer and a water transport protein or synthetic mimic. That is, the active ingredient is within the vesicles. Also provided herein are methods of delivering an active ingredient to a patient, which includes administering the composition to the patient.

"Patients" may include any mammal, such as humans, who may or may not be in need of treatment. The term "patient" is not intended to imply that one to whom an active ingredient is being administered, is necessarily already undergoing treatment for an ailment. By way of non-limiting example, it is contemplated that the present compositions may include administration of prescription medications to a patient in need of such prescriptions, and/or the compositions may simply include administration of vitamins to be administered to a patient that does not necessarily need each and every vitamin administered.

Compositions that may be administered in accordance herewith may include one or more "active ingredients" or "drugs." The terms "active ingredients" and "drugs" are used interchangeably herein to include any drug or other active ingredient that may be used for treating mammals for a variety of different conditions. These terms are not meant to be limiting at all, and may include any "active ingredient" and "drug" known to those skilled in the art. Non-limiting examples of active ingredients or drugs in accordance herewith may include any drug that may need to be protected during drug delivery, or any drug that may need to be delivered to a specific site. By way of non-limiting example, the drug may include a statin, such as pravastatin. The terms "active ingredients" and "drugs" are also intended to encompass analogs, prodrugs, salts, esters, polymorphs, and/or crystalline forms of active ingredients and drugs, as would be apparent to those skilled in the art.

Example compositions may also optionally include one or more excipients or other ingredients as would be apparent to those skilled in the art. The term "excipient" is used herein to include pharmaceutically acceptable inert substances added to a drug formulation to give e.g., a desired consistency or form.

The administering may be performed by any method of administering vesicle compositions known to those skilled in the art. By way of non-limiting example, compositions herein may be administered intravenously, intraperitoneally, orally, subcutaneously, intradermally, intramuscularly, intravascularly, endotracheally, intraosseously, intra-arterially, intravesicularly, intrapleurally, intraventricularly, or topically.

Non-limiting example embodiments are also directed to methods that include using the membranes provided herein for make up water treatment. The use of the present membranes to treat water using the reverse osmosis process will make make-up water production much easier because of compactness of the equipment. This will help in alleviating problems with water contamination as delivery of treated water (however clean it might be) from a central treatment location leads to contamination. On-site treatment provides more quality control. Further provided is treated water resulting from the present methods.

As will be more apparent below in describing example methods of making membranes or films, non-limiting examples of membranes, films or a polymer matrix herein, may include triblock ABA copolymer or other amphiphilic block or graft triblock copolymers having water transport proteins, such as Aquaporin, or their synthetic mimics inserted therein, wherein the membrane has a substantially flat configuration. According to further example embodiments, the triblock ABA copolymer may include a poly(2-methyloxazoline)-block-poly(dimethylsiloxane-block-poly(2-methyloxazoline) (PMOXA-PDMS-PMOXA) block polymer.

An ABA polymer alone has a low permeability, which is largely increased upon incorporation of AqpZ or other water transport protein therein. A dramatic increase in permeability observed upon incorporation of AqpZ indicates that the water channel protein is functional in the synthetic context. This increased permeability varies with the AqpZ:ABA ratio and shows an activation energy indicative of channel mediated transport.

ABA triblock copolymers were found to be relatively impermeable when compared to other membranes, with a productivity of 0.22 (μm/s)bar$^{-1}$ at 20° C. as compared to the reported value for a similar diblock copolymer (Polyethylene oxide-Polyethylethylene designated OE-7) with normalized permeability of 5.7 (μm/s)bar$^{-1}$ at 20° C. (calculated from Discher, B. M.; et al., "Polymersomes: Tough vesicles made from diblock copolymers," Science 1999, 284, (5417), 1143-1146). The large difference in the size of the hydrophobic blocks between the ABA polymer (110 units of PDMS) and the diblock copolymer studied by Discher, et al (37 units of Polyethyleneethylene (EE)) could account for this difference. The permeabilities of lipid membranes are reported to be an order of magnitude higher than OE-7 copolymer (Discher, et al., (1999)). The incorporation of AqpZ increases the productivity of ABA membranes by ~800 times to 167 (μm/s)bar$^{-1}$ (see FIG. 1).

Figure 1:
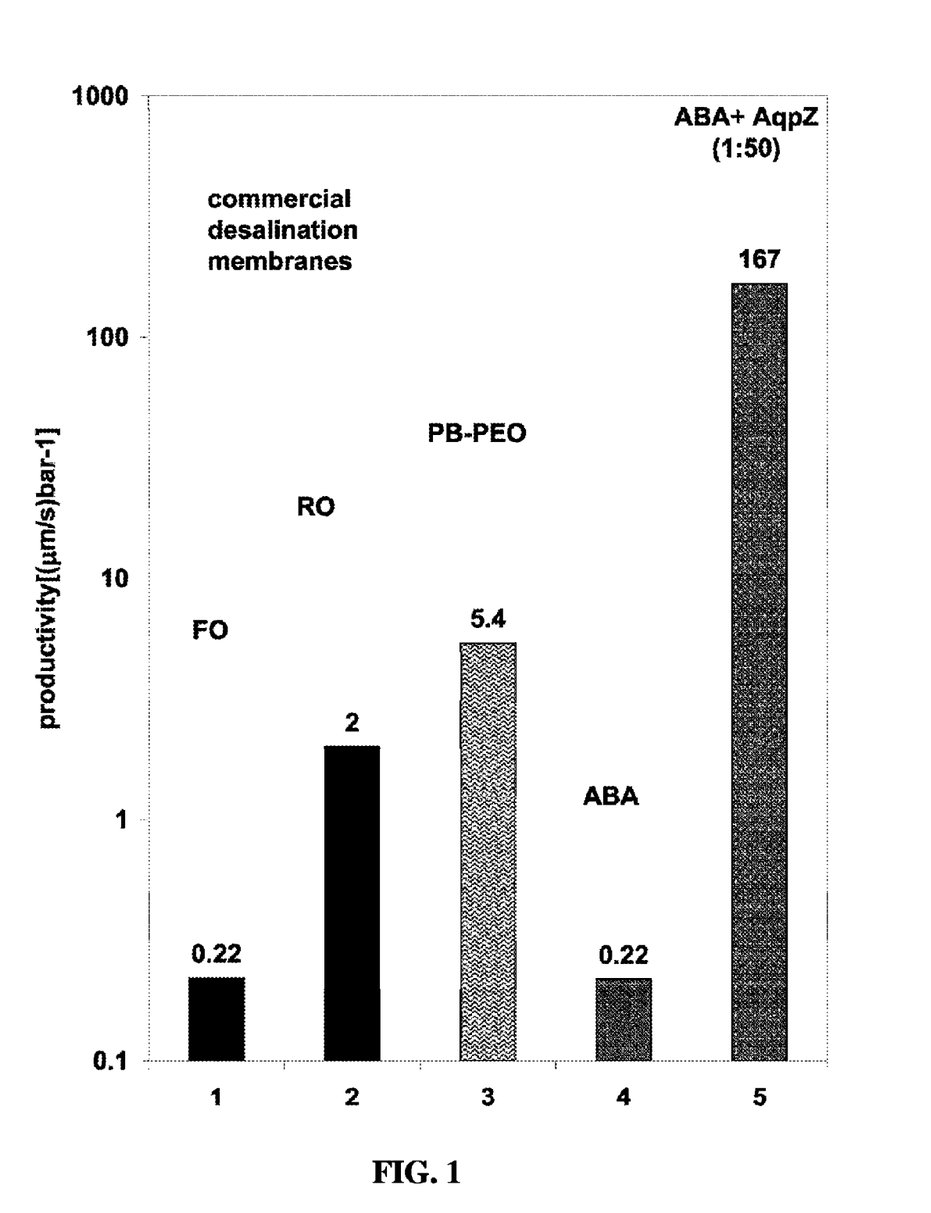
FIG. 1 shows a comparison of reported permeability values for polymeric membranes to those obtained by the present membranes.

The productivities of AqpZ-ABA membranes exceed those for any salt-rejecting membrane. A comparison of the measured permeability values to those measured by other researchers for block copolymer membranes and to commercial reverse osmosis and forward osmosis membranes is shown in FIG. 1. It can be seen from this comparison that the protein-polymer of the examples of the present system represents more than an order-of-magnitude improvement over existing commercial solute-rejecting membranes. In FIG. 1, FO is commercial forward osmosis membrane with data from McCutcheon and Elimelich (2006) at 2° C. RO is commercial reverse osmosis desalination membrane with data from Matsura (2001) at room temperature (assumed 25° C.). PB-PEO is Polybutadiene Polyethylene diblock polymer with data from Discher, et al (1999) at temp of 20° C. ABA represents the polymer vesicles used in study with permeability calculated at 20° C. ABA+AQP represents the polymer vesicles with incorporated AqpZ at 1:100 molar ratio at a temperature of 20° C. Data for ABA and AqpZ were obtained at 5.5° C. and calculated at 20° C. using $E_a$ values.

Furthermore, the AqpZ-ABA membrane is selective for water over small solutes such as salt, glucose, urea and glycerol.

A magnitude of increase in permeability and the excellent solute rejection capabilities demonstrate the potential benefit of the present membranes for water treatment and drug delivery.

Non-limiting example embodiments are also directed to methods of making the membranes or films described herein. Example methods include providing on a liquid an amphiphilic lipid or polymer template film having specific functional groups thereon. The specific functional groups may include for example, a molecule that will specifically interact with a complementary molecule introduced on a water transport protein or synthetic mimic. Non-limiting examples may include Ni-Histidine interaction or biotin-streptavidin interaction, antigen-antibody interaction, metal complex formation, base pairing and the like. By way of non-limiting example, the amphiphlic lipid or polymer template film may have NTA nickel groups.

The methods also include inserting a water transport protein or a synthetic mimic in the liquid below the amphiphilic copolymer. The methods further include inserting a block copolymer solubilized in detergent, in the liquid. The water transport protein or synthetic mimic and the block copolymer may be administered to the liquid together as a mixture.

The methods herein then include removing the detergent such that block copolymer arranges around the water transport protein or synthetic mimic and the block copolymer/water transport protein (or synthetic mimic) binds to the amphiphilic copolymer in a substantially flat configuration. The present methods further include separating the amphiphilic copolymer, leaving a substantially flat film that includes the water transport protein (or synthetic mimic) and block copolymer.

Figure 2:
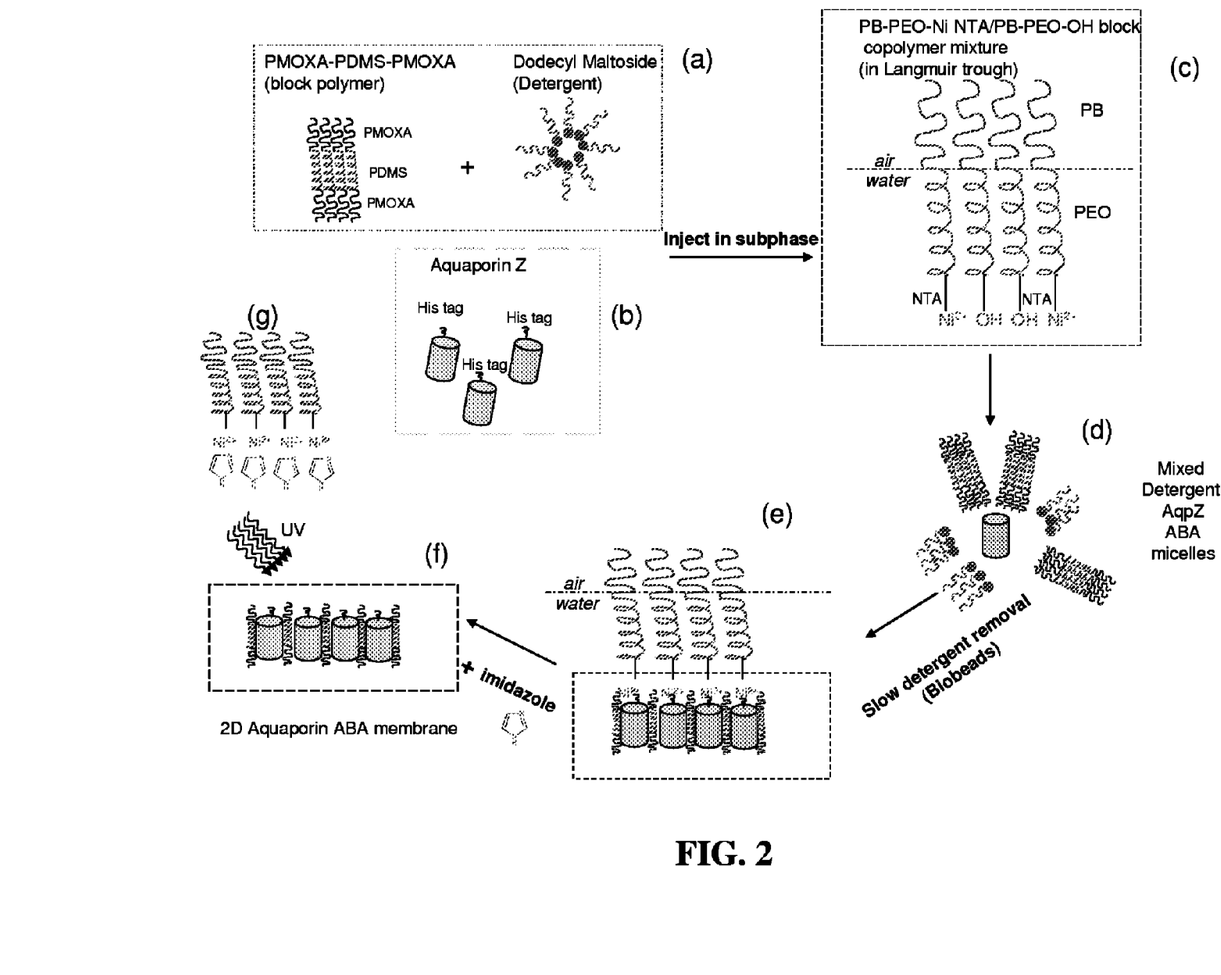
FIG. 2 depicts an example method of making a substantially flat membrane or film in accordance with non-limiting example embodiments.

A non-limiting example embodiment of methods provided herein is depicted in FIG. 2. As shown in FIG. 2(a) the block or graft triblock copolymer is a crosslinkable ABA block polymer, (in this example, PMOXA-PDMS-PMOXA block polymer) with methacrylate end groups, which is dissolved in a detergent dodecyl maltoside (DDM). At least one amphiphilic lipid or copolymer template film having specific functional groups is then provided on a liquid. By way of non-limiting example, as shown in FIG. 2(c), a mixture of block polymers or lipids with $Ni^{2+}$ groups and the same polymer with another group may be dissolved in a solvent (e.g., chloroform) and then spread at the air-water interface. Examples of block copolymers may include the Polybutadiene-polyethylene oxide Ni-NTA polymer (NTA polymer) with Polybutadiene-polyethylene oxide OH polymer (OH polymer). The air-water interface can be created for example in a Langmuir Blodgett trough or a similar apparatus to reach surface pressures at which a compact arrangement of a monolayer is achieved. (See FIG. 2(c)). The ABA block polymer may then be mixed with a water transport protein or a synthetic mimic. As shown in FIG. 2, an ABA polymer is mixed with an Aquaporin Z stock solution (FIG. 2(b)) to get polymer to AqpZ ratios within a range of about 0.1-2 w/w. The mixture of block polymer (e.g., ABA polymer solubilized in detergent) and water transport protein (e.g., AqpZ) may then be injected in the subphase (FIG. 2(c)) of the trough with the monolayer.

After the mixture of block polymer (e.g., ABA polymer solubilized in detergent) and water transport protein (e.g., AqpZ) are injected in the subphase of the liquid, mixed micelles of ABA, AqpZ and detergent will form in the subphase as illustrated in FIG. 2(d).

Thereafter, detergent may be slowly removed using e.g., polymer detergent beads ("biobeads") or other means such as dialysis or cyclodextrin. During this time the subphase may be gently stirred to promote the interfacial interaction of His-tagged AqpZ molecules with Ni-NTA groups of the NTA polymer. When detergent is removed slowly it is expected to promote self assembly of the ABA polymer around the AqpZ molecules, leading to formation of a thin film underlying the Ni functionalized polymer or lipid interfacial monolayer. (FIG. 2(e)). The AqpZ-ABA film (FIG. 2(f)) may then be separated from the NTA polymer using e.g., high concentrations of imidazole, which will compete with AqpZ's histidine-tags for the Ni-NTA sites on the NTA polymer (FIG. 2(g)). The remaining AqpZ-ABA film is a substantially flat membrane of water transport protein and block polymer (e.g., AqpZ and PMOXA-PDMS-PMOXA). This submerged film may then be irradiated with UV to crosslink the polymer.

In the present methods, the template film may include lipids or other amphiphilic molecules (including polymers) with specific functional groups that specifically interact with a molecule that has been introduced into the protein. These specific interactions include Ni-Histidine interaction or biotin-streptavidin interaction, antigen-antibody interaction, metal complex formation, base pairing, and so on. The amphiphilic copolymer, may include for example, a Polybutadiene-polyethylene oxide Ni-NTA polymer (such as Polybutadiene-co-poly(ethyleneoxide)-succinicanhydride-(N,N-Bis[(tert-butyloxycarbonyl)methyl]-L-lysine-nickel (II)), with Polybutadiene-polyethylene oxide OH polymer (i.e., PB-PEO-Ni NTA/PB-PEO-OH block copolymer mixture). Accordingly, example embodiments include compositions that include a PB-PEO-Ni NTA/PB-PEO-OH copolymer. The amphiphilic copolymer may be provided at the liquid-air interface of the liquid.

According to example embodiments, the amphiphilic lipid or copolymer having specific functional groups, acts as a template for the assembly of e.g., Aquaporin Z monomers (or tetramers). By way of example, a block copolymer with a Ni-NTA group is an amphiphilic copolymer that forms a template film at the air/water interface. Then, according to example embodiments, recombinant Aquaporin-Z with histidine tags may be injected below the film (into the water or other liquid), so that the Aqps are ordered in a 2-D crystal-like arrangement.

The 2-D assembly of Aquaporin Z may then be reinforced by using ABA polymers for example, which fill in defects and provide rigidity. Thus, an ABA polymer, such as PMOXA-PDMS-PMOXA may also be injected into the liquid to fill the spaces around the Aqp to form a membrane. This polymer rejects salt well.

The liquid in example methods may include for example, water. Other example methods may include any liquid that does not dissolve any of the blocks of the components used in the template or in the membrane forming polymer. The liquid may include other aqueous solutions, so long as the protein is not denatured.

The water transport protein may be as described herein with respect to other embodiments. According to non-limiting example embodiments of methods herein, the water transport protein may be provided in a detergent, such that it is in a stable form. By way of example, the water transport protein may be present with any number of zwitterionic detergents at various concentrations including dodecyl maltoside, octyl glucoside, CHAPS and so on, as would be apparent to those skilled in the art, before the water transport protein is inserted in the liquid below the amphiphilic copolymer film. Accordingly, insertion of the water transport protein or synthetic mimic may necessarily include insertion of a certain amount of detergent. The insertion method may include for example, injection. Thus, according to non-limiting embodiments insertion of a water transport protein may include injecting into a liquid a composition comprising Aquaporin-Z in a detergent such as 1% dodecyl maltoside.

The block or graft copolymer may be as described herein with respect to other embodiments. For example, it may be an amphiphlic block or graft triblock copolymer, such as a crosslinkable ABA polymer. By way of non-limiting example, the block copolymer may have methacrylate end groups. According to non-limiting example embodiments of methods herein, the block or graft copolymer may be dissolved in or otherwise combined with a detergent, such as dodecyl maltoside. The insertion method may include for example, injection. According to example embodiments, the block copolymer may be a crosslinkable ABA polymer with methacrylate end groups that is dissolved in a detergent including dodecyl maltoside before injecting the block copolymer into a liquid. The block polymer may be present in a range of concentrations, including for example 0.5%-5% w/w, or according to example embodiments, approximately 2% w/w. According to non-limiting example embodiments, the method may include injecting a block copolymer that includes PMOXA-PDMS-PMOXA, such as $PMOXA_{15}$-$PDMS_{110}$-$PMOXA_{15}$.

According to example embodiments, the molar ratio of injected water transport protein, such as Aquaporin-Z, to injected block or graft copolymer may be between about 0.1:1 and 10:1. According to further embodiments, the molar ratio is about 1:1.

According to non-limiting example embodiments, as indicated above, the detergent may include e.g., dodecyl maltoside. The detergent is present with the polymer and the protein to solubilize them.

The step of removing the detergent may include for example performing slow detergent removal using polymer absorbent beads such as biobeads. This could also be performed using a variety of other methods such as dialysis or the use of cyclodextrin addition.

Because the membrane of water transport protein and block copolymer is "tethered" to the template (amphiphilic copolymer), the amphiphilic copolymer should be detached. This can be done e.g., by adding a competitive molecule that can interact with the Ni-NTA group in certain example amphiphilic copolymers, and detach it from Histidine groups that may be tagged on the water transport protein. According to non-limiting example embodiments, the amphiphilic copolymer may be separated from the block copolymer/water transport protein configuration for example, by exposing the amphiphilic copolymer to imidazole or any molecule that breaks the specific interaction between the complementary groups on the interfacial layer and the group on the protein that it specifically interacts with. That is, the amphiphilic copolymer is exposed to a molecule that breaks the specific interaction between the template film and the substantially flat film comprising the water transport protein or a synthetic mimic and block copolymer. Imidazole is specific to Ni and Histidine interaction. As would be apparent to those skilled in the art, other molecules may be appropriate for breaking other interactions, such as biotin-streptavidin interaction, antigen-antibody interaction, metal complex formation, base pairing and the like. After the amphiphilic copolymer is removed, a substantially flat film remains, which film includes the water transport protein and block copolymer.

Example methods may further include crosslinking the block copolymer. The crosslinking may be performed by a variety of methods. By way of example, crosslinking may be performed by electromagnetic radiation, temperature, chemical reactions or irradiating the substantially flat film/membrane, e.g., water transport protein/block copolymer configuration, to crosslink the block copolymer with UV irradiation. According to non-limiting example embodiments, methods may include irradiating an Aquaporin-Z/block copolymer configuration with UV irradiation in solution to crosslink the polymer. The film or membrane may then be put on a microporous support if desired to act as a planar membrane.

Non-limiting example embodiments of methods provided herein include providing a film of amphiphilic molecules with specific functional groups at a liquid air interface of water; injecting in the water recombinant Aquaporin or a synthetic mimic thereof having a complementary functional group to the specific functional groups of the amphiphilic molecules; injecting in the water a block copolymer solubilized in detergent; removing the detergent and allowing the Aquaporin or synthetic mimic and block copolymer to arrange themselves into a substantially flat Aquaporin-Z/block copolymer configuration on a water side of the film of amphiphilic molecules; detaching the film of amphiphilic molecules from the Aquaporin or synthetic mimic/block copolymer configuration; and irradiating the Aquaporin or synthetic mimic/block copolymer configuration with UV irradiation in solution to crosslink the polymer.

Provided herein are methods of treating a liquid, such as water, that include contacting the liquid with a substantially flat polymer matrix that includes a water transport protein, such as Aquaporin (e.g., Aquaporin Z) or a synthetic mimic thereof, and a block polymer. The block polymer may include an ABA block copolymer such as a PMOXA-PDMS-PMOXA block polymer. Further example embodiments include methods of treating liquids by using the membranes or films disclosed herein to remove contaminants from the liquid. By way of non-limiting example, methods for removing contaminants, such as salt, from a liquid may include contacting the liquid with a substantially flat polymer membrane that includes a block or graft copolymer and a water transport protein, such as Aquaporin, or a synthetic mimic therein. According to example embodiments, the membrane or film may be removed from the original liquid and applied to a different liquid for treatment as long as the liquid does not dissolve or inactivate any components of the membrane.

The protein polymer membranes provided herein show excellent salt rejection and high permeabilities ideal for water treatment membranes used for desalination. Excellent control over the permeability of polymers is also demonstrated. Incorporation of AQPs or suitable molecular mimics into compatible synthetic polymers such as the block copolymer system provided herein is an innovative approach for making solute-rejecting membranes for medical, industrial and municipal desalting applications. Thus, the methods herein may be applied for example, to municipal water treatment, industrial water treatment, or medical water treatment. The methods herein may also be applied to osmotic power generation.

It is contemplated that scaled-up, industrial production of the membranes is possible, following techniques in membrane, polymer coatings and biotechnology industries. It is also contemplated that methods herein may include recycling certain of the materials used in the present methods.

The following examples are provided to further illustrate various non-limiting embodiments and techniques. It should be understood, however, that these examples are meant to be illustrative and do not limit the scope of the claims. As would be apparent to skilled artisans, many variations and modifications are intended to be encompassed within the spirit and scope of the present disclosure.

EXAMPLES

Example 1

To investigate the potential of protein polymer membranes for water treatment applications, solute and water transport properties as well as physical characteristics were analyzed for a specific protein-polymer membrane. This membrane includes a triblock copolymer with AqpZ inserted therein, which is referred to herein as an AqpZ-ABA membrane.

The composition of the symmetric triblock copolymer in these experiments is $PMOXA_{15}$-$PDMS_{110}$-$PMOXA_{15}$, however the present application is in no way limited to this particular copolymer. This particular ABA polymer has a large hydrophobic block (110 PDMS groups) that is expected to result in more mechanical stability and low permeability. The physical characteristics of the ABA triblock copolymer were studied using microscopy techniques, while light scattering was used to characterize the permeability.

Synthesis of AqpZ-ABA Polymer Membranes

Histidine-tagged AqpZ was over-expressed in *Escherichia coli* and purified using nickel affinity chromatography (Borgnia, et al. (1999)). A large yield of pure protein (between 2.5 and 15 mg/L of culture) was obtained for three different purification runs, indicating the potential for large yields using the procedures described.

$PMOXA_m$-$PDMS_n$-$PMOXA_m$ (ABA) triblock copolymers were synthesized using a ring opening cationic polymerization procedure. Polymer vesicles were produced using the film rehydration method described in detail below.

Expression and Purification of AQP-Z

The AqpZ over-expression vector pTrc10His AqpZ was transformed into the *Escherichia coli* strain JM109 by electroporation. Growth, isopropyl-β-D-thiogalactoside induction and Ni-NTA affinity chromatography purification of AqpZ were performed as described in Borgnia, et al (1999) with two modifications. Ni-NTA agarose beads were obtained from Qiagen, Inc. (Valencia, Calif., USA). The induction time was optimized at 7-8 hours and this was used for all the protein production experiments. The ultracentrifugation setup for recovery of membrane fractions was replaced by the use of a Biomax filter (MWCO of 30 KDa, Billerica, Mass., USA) in a centrifuge for 45-60 minutes for removal of smaller molecular weight material.

Protein purification was followed by solubilization with cracking buffer with 1% dodecyl maltoside and running polyacrylamide gel electrophoresis (Sambrook, J.; Fritsch, E. F.; Maniatis, T., *Molecular Cloning: A Laboratory Manual.* 2nd ed.; Cold Spring Harbor Laboratory: N.Y., 1989). The detergent dodecyl maltoside used in protein purification was obtained from Anatrace Chemicals (Maumee, Ohio, USA). The purified protein was quantified using the Lowry method (Lowry, O. H.; et al., "Protein measurement with the Folin phenol reagent." *J Biol Chem* 1951, 193, (1), 265-75).

Synthesis of ABA Polymer

The ABA polymer was a symmetric poly-(2-methyloxazoline)-block-poly (dimethylsiloxane)-blockpoly (2-methyloxazoline) ($PMOXA_{15}$-$PDMS_{110}$-$PMOXA_{10}$). The first step of the synthesis procedure involved acid catalyzed polycondensation of dimethoxydimethyl silane in presence of water and end-capper resulting in butylhydroxy terminated bi-functional PDMS. Liquid PDMS was purified by vacuum stripping at 80° C. and precipitation in equal (by weight) water/methanol mixture. Purified PDMS was reacted with triflicacid anhydride in hexane at −10° C. for three hours resulting in triflate-PDMS bi-functional macroinitiator. The reaction mixture was than filtered under argon through a G4 filter. Hexane was evaporated under vacuum and dry ethyl acetate was added as reaction solvent. Addition of dry 2-methyl-2-oxazoline resulted in symmetric ring-opening cationic polymerization of PMOXA blocks on the macroinitiator. The reaction was terminated by addition of a methanol solution of potassium hydroxide.

Example 2

Preparation of ABA Vesicles and AQP Incorporation for Drug Delivery Applications Block copolymer vesicles (1-2 wt. % of polymer in phosphate buffer saline (PBS) at pH 7.4) were prepared using the film rehydration method. 60 mg of polymer was first dissolved in chloroform (5-10 ml) and the chloroform was evaporated slowly in a rotary vacuum evaporator at 40° C. and a vacuum of less than 400 mbar to form a even film on the inside of round bottomed flasks. This film was then further dried under high vacuum of 0.3 mbar for at least four hours. 10 ml PBS was then added drop wise to the film with alternating vigorous vortexing and periodic sonication (of durations less than 30 s) over several minutes. This mixture was then left stirring for at least eight hours. This suspension was then extruded several times through a 0.4 micron track etched filter (Isopore, Millipore Corporation, Billerca, Mass., USA), followed by a 0.2 micron track etched filter (Nucleopore, Whatman, Newton, Mass., USA) to obtain monodisperse unilamellar vesicles. For reconstitution experiments 500 μL of an AqpZ stock solution (1.6 mg $mL^{-1}$ in 1.5% dodecyl maltoside, 66 mM $KH_2PO_4$, 133 mM NaCl, 13% glycerol, 3.33 mM (β-mercaptoethanol (BME), and 33.33 mM Tris was added during the formation of the polymer vesicles and subsequent steps were completed on ice. The resulting protein-containing vesicles were purified chromato-graphically using a column packed with Sepharose 4B to remove non-incorporated protein and detergent traces. Sepahrose 4B, which was used for chromatographic separation was obtained from Sigma Aldrich (USA and Switzerland).

Characterization of Polymer Vesicles for e.g., Drug Delivery Applications

To determine the permeability and solute rejection properties of polymer vesicles using stopped flow spectroscopy a knowledge of the physical dimensions (radius in hydrated state) and morphology (hollow versus solid sphere structure) is necessary. ABA polymer vesicles were therefore characterized using static and dynamic light scattering, Transmission Electron Microscopy (TEM), cryo-TEM, and Atomic Force Microscopy (AFM).

Using dynamic light scattering, a hydrodynamic radius ($R_h$) of approximately 160 nm was estimated. This size is consistent with similar PMOXA-PDMS based block copolymers with shorter hydrophobic blocks Nardin, et al., (2000) *Langmuir* 16, 1035-1041.

The static and dynamic light scattering experiments were performed according to the description presented in (Nardin, C.; et al., "Polymerized ABA triblock copolymer vesicles," *Langmuir* 2000, 16, (3), 1035-1041) using a commercial goniometer (ALV Langen) equipped with a frequency-doubled Nd:YAG laser (ADLAS, wavelength 532 nm) at scattering angles between 30° and 150°.

The ratio of the radius of gyration ($R_g$) from static light scattering experiments to the hydrodynamic radius from dynamic light scattering was ~1 ($R_g/R_h$=1.03) and supports a hollow sphere morphology (Nardin, C.; et al., "Polymerized ABA triblock copolymer vesicles," *Langmuir* 2000, 16, (3), 1035-1041). The molecular weight of each vesicle was estimated at $52\times10^6$ g/mol using static light scattering.

Transmission Electron Microscopy (TEM) and cryo TEM were also conducted on these particles. Transmission electron microscopy was conducted on vesicle samples using a Phillips 400 TEM. The samples were prepared by dilution up to 1000 times and then stained with 2% uranyl acetate on plasma treated copper grids. The TEM images show relatively uniform sizes for the different vesicles imaged.

Cryogenic transmission electron microscopy (cryoTEM): The vesicle suspension was deposited on holey carbon grid and frozen rapidly by plunging into liquid ethane above its freezing point using a cryo holder. This holder was then transferred to the TEM and imaged in transmission mode at 200 kV at liquid nitrogen temperature. The equipment used for this measurement was a Zeiss 922 Omega microscope with a Gatan CT3500 Cryo Holder and a Gatan Ultrascan 1000 camera system. From cryoTEM, the radius of the vesicles in the hydrated state was 117 nm.

Figure 3:
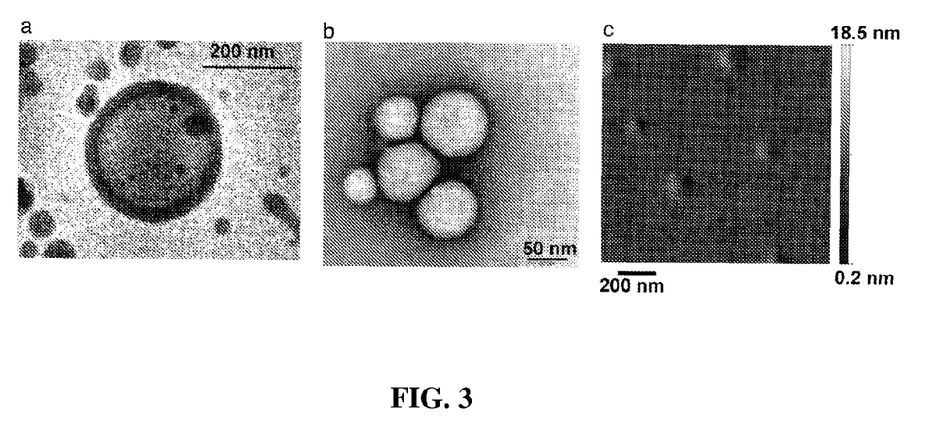
FIG. 3 depicts examination of polymer vesicles using microscopy.

FIG. 3 shows representative images of polymer vesicles obtained from electron microscopy. Radii estimated from cryoTEM were used in further calculations of permeability as this method best preserves the structural features of vesicular structures (Almgren, M.; et al., "Cryo transmission electron microscopy of liposomes and related structures," *Colloids and Surfaces α-Physicochemical and Engineering Aspects* 2000, 174, (1-2), 3-21). The cryogenic transmission electron microscope (TEM) images were used for size determination as regular TEM and Atomic force micrograph (AFM) influence the structure of the observed vesicles. FIG. 3(*a*) is a cryogenic transmission electron micrograph of an ABA polymer vesicle (scale bar 200 nm) FIG. 3(*b*) is an electron micrograph of a cluster of vesicles (scale bar 50 nm). FIG. 3(*c*) is an atomic force micrograph of vesicles on mica in non-tapping mode. This figure shows that a film of polymer is formed on the hydrophilic mica surface with vesicles located in the films.

The presence of spherical vesicle like aggregates with a hydrophilic corona was further supported by Atomic Force Microscopy (AFM) measurements. AFM measurements were conducted using a Picoscan SPM LE scanning probe microscope equipped with a Picoscan 2100 SPM controller (Agilent Technologies, Chandler, Ariz., USA). Measurements were conducted in tapping mode using a Si cantilever (NCH) (Nanosensors, Neuchatel, Switzerland). The length of this cantilever was 125 μm and the nominal force constant was 42 N/m. Samples were prepared by placing a dilute vesicle suspension on freshly cleaved mica for 1 minute and then carefully washing with double distilled water. During AFM, when the suspension of dilute vesicles is spread on a hydrophilic mica surface, a film, punctuated with emerging vesicles, was seen to form (FIG. 3).

Permeability Measurements

The permeabilities of ABA and AqpZ-ABA vesicles were investigated using stopped flow light scattering experiments as described in Borgnia, et al, 1999. In particular, permeability measurements were conducted by measuring light scattering of the polymer vesicles placed under an outwardly directed osmotic gradient of salt in a stopped flow apparatus (SV 0.17 mB, Applied Photophysics, Letterhead, UK). According to this method, water permeability is measured by rapid mixing of the vesicles with a solution containing the osmotic agent (e.g., salt, glucose, glycerol or urea) causing water efflux from the vesicles. In this case, vesicle suspensions were rapidly mixed with osmotic solutions (1.7 osmol/L) of salt (NaCl). The shrinkage of these vesicles was followed by monitoring the increase in light scattering with time. Changes in light scattering caused by this shrinkage were recorded at an emission wavelength of 600 nm in the stopped flow apparatus.

Under these conditions a reduction in vesicle volume leads to an increase in the relative light scattering measurements as described in Borgnia, et al. (1999), according to the methods developed by Milon, et al, (1986) *Biochimica Et Biophysica Acta* 859, 1-9. These experiments were conducted with pressure in the mixing cell held constant at 7 bar to minimize pressure variations that could complicate the analysis of kinetics. Results were corrected for the mechanical compression resulting from this pressure by subtracting the baseline observed in control experiments without osmotic agents. These data were then fitted to an exponential rise equation to calculate the exponential coefficient and the osmotic water permeability ($P_f$) was calculated using the following expression (Borgnia, et al. (1999)):

$$P_f = k/(S/V_o) \times V_w \times \Delta_{osm}$$

Where, k is the exponential rise rate constant for the initial rise in the light scattering curve, S is the initial surface area of the vesicles, $V_o$ is the initial volume of the vesicles, $V_w$ is the molar volume of water (18 cm$^3$), and $\Delta_{osm}$ is the difference in osmolarity driving the shrinkage of the vesicles.

The initial rise in the experimental data was fitted to the exponential rise equation above, and the exponential coefficient (k) was used in calculating permeability. These results are shown in FIG. 4 for the ABA and AqpZ-ABA vesicles with a protein to polymer molar ratio of 1:200.

Figure 4:
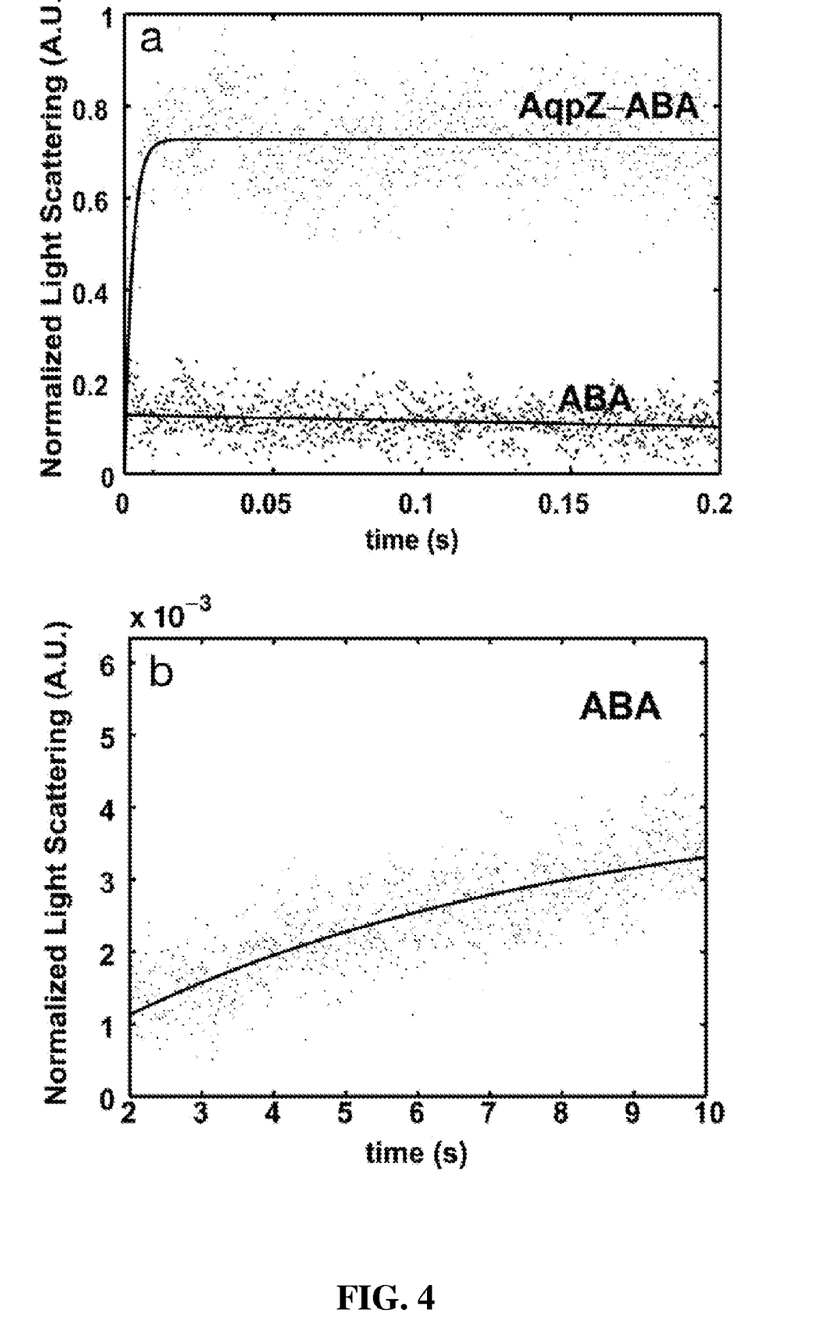
FIG. 4 depicts the results of stopped flow light scattering experiments.

FIG. 4 depicts stopped flow light scattering experiments. FIG. 4(a) depicts an increase in relative light scattering with and without reconstituted AqpZ into the ABA polymer at 5.5° C. at a molar ratio of 200:1 (polymer:protein). Fits are shown as guides. The initial rise rates were used to calculate the permeability. As seen from FIG. 4(a) a rise cannot be calculated for the pure ABA polymer vesicles. FIG. 4(b) shows the rise in scattering between 2 and 10 seconds for the polymer that was used in calculating permeability at 5.5° C.

For AqpZ-ABA vesicles the time scale for the exponential rise was between 5 and 20 milliseconds, while up to 10 seconds were required to capture the exponential rise in light scattering of ABA vesicles because of its low permeability. The calculated permeabilities of the ABA and the AqpZ-ABA vesicles were 0.8 µm/s and 74 µm/s respectively based on these results. This represents a large permeability increase of ~90 times with protein incorporation. Assuming complete incorporation of proteins into the polymer vesicles, a maximum of 25 monomers per vesicle is expected to be incorporated based on the molecular weight of the vesicles estimated from static light scattering. Using the calculated permeability of 74 µm/s, 25 monomers per vesicle and the surface area of each vesicle, the calculated water permeability for each AqpZ tetramer is $13 \times 10^{-14}$ cm$^3$/s, which is similar to that that reported for AqpZ reconstituted into liposomes ($\cong 10 \times 10^{-14}$, Borgnia, et al. 1999).

Calculation of Activation Energies

Activation energies of water transport calculated by conducting experiments over a wide range of temperatures can be used to characterize the transport across the vesicle membranes as diffusion-driven or channel-mediated. Calculated permeabilities for the AqpZ-ABA vesicles indicate an increase of 38 to 94 times over ABA vesicles in these experiments.

Several sets of experiments were conducted with similar conditions but different preparations (prepared in different batches) to ensure repeatability. Additionally, initial experiments with up to 12 traces per experimental condition showed that five traces were adequate for providing sufficient data for analysis, so in subsequent detailed experiments a minimum of five were acquired per experimental condition. Data analysis was conducted by averaging a minimum of five traces for each scattering experiment and then fitting the initial rise to an exponential equation using the curve fitting toolbox available through the MATLAB software (Mathworks, Natick, Mass., USA).

Figure 5:
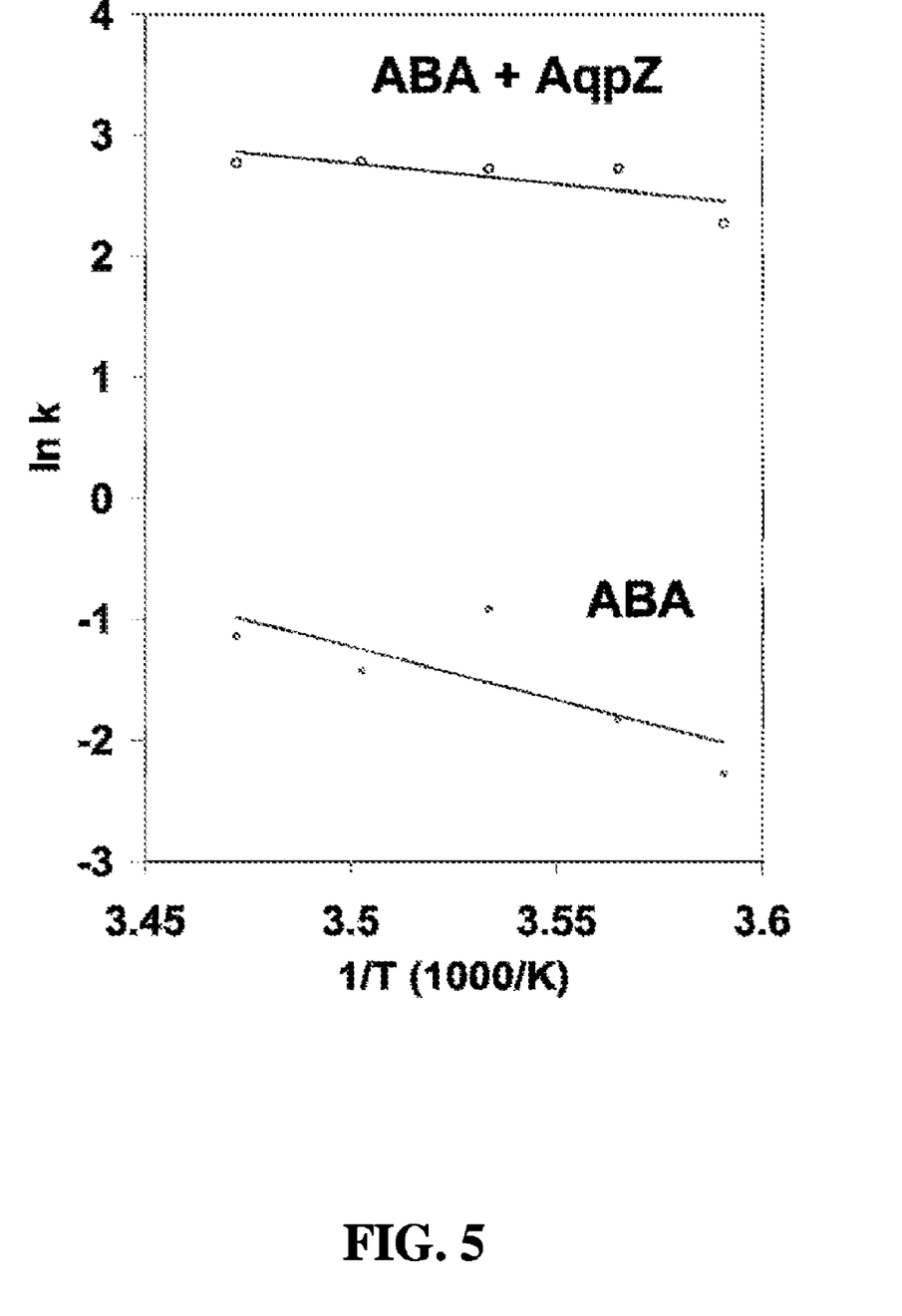
FIG. 5 depicts Arrhenius plots for calculation of activation energy for osmotic transport of water across polymer membranes with incorporated AqpZ (ABA with AqpZ) and pure polymer membranes (ABA).

Stopped flow experiments were repeated at different temperatures (5.5, 7.5, 10, 12.5 and 15° C.) for the ABA and AqpZ-ABA vesicles. The exponential rise rates calculated from these experiments exponential were plotted against the inverse of temperature to determine the Arrhenius activation energies. FIG. 5 depicts Arrhenius plots for calculation of activation energy for osmotic transport of water across polymer membranes with incorporated AqpZ (ABA with AqpZ) and pure polymer membranes (ABA).

The Arrhenius activation energy calculated for the ABA vesicles was 8.7 kcal/mol, while the AqpZ-ABA vesicles had a value of 3.4 kcal/mol. The higher values obtained for ABA membranes is consistent with the values of activation energies reported for polymer membranes in the measured temperature range (Garybobo, C. M., "Effect of Geometrical and Chemical Constraints on Water Flux across Artificial Membranes. *Journal of General Physiology* 1971, 57, (5), 610-621; and Mehdizadeh, H.; Dickson, J. M.; Eriksson, P. K., "Temperature Effects on the Performance of Thin-Film Composite, Aromatic Polyamide Membranes," *Industrial & Engineering Chemistry Research* 1989, 28, (6), 814-824) indicating transport by diffusion through the polymer. The low activation energy for the AqpZ-ABA vesicles is strong evidence for channel-mediated water transport across the vesicle membrane. This value is also consistent with the low activation energy values obtained with proteoliposomes with incorporated AqpZ (Borgnia, et al. (1999)) and with oocytes with inserted AQP1 (Preston (1992)).

Example 3

Reflection Coefficients

The reflection coefficient of solutes in membrane systems determines the extent to which a particular solute will be excluded from the filtered water. The relative reflection coefficients of salt, urea, glucose, and glycerol were determined based on the method described by Meinild, et al (1998). Glucose was used as the reference solute and the comparative experiments were all conducted at 15° C. Glucose was taken as the reference solute with an assumed reflection coefficient of 1 because of its relatively large molecular size. The calculated reflection coefficients of salt, glycerol and urea were >1 indicating higher rejection of salt, urea and glycerol when compared to glucose. These reflection coefficients are higher than the values reported by Meinild, et al. for the same solutes but are within the experimental error for these calculations.

The productivity values obtained for AqpZ-incorporated polymers were an order of magnitude or larger than for existing salt-rejecting polymeric membranes. This approach represents an exciting new direction for developing more efficient water treatment membranes for municipal and medical applications. The distinct levels of permeability obtained by using different concentrations of AqpZ may provide a key property for drug delivery applications.

Example 4

Effect of Protein-to-Polymer Ratio on Permeability

Figure 6:
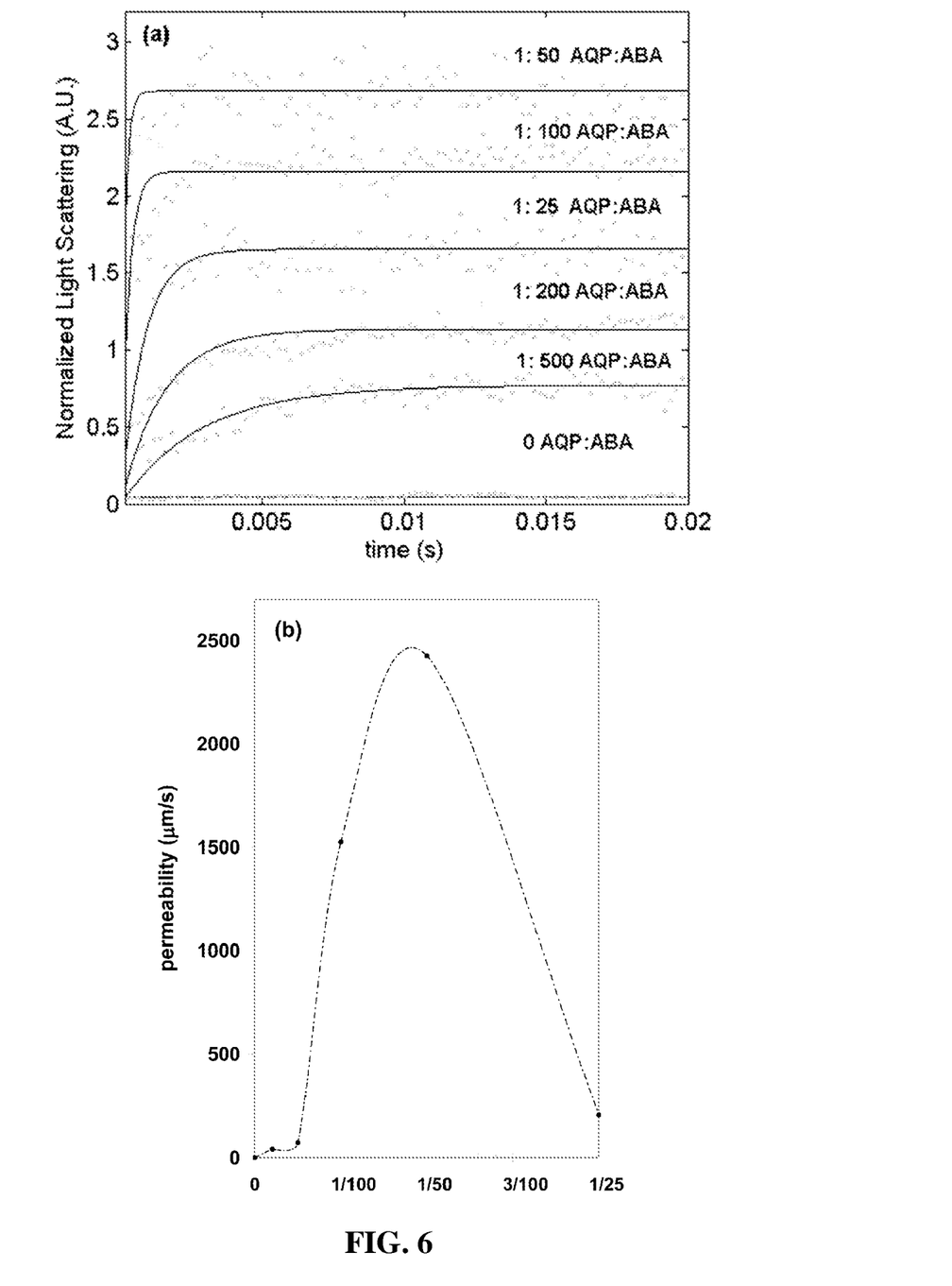
FIG. 6 depicts the effect of increasing AqpZ concentrations on the permeability of ABA polymers.

Stopped flow experiments were conducted with protein to polymer molar ratios of 1:25, 1:50 1:100, 1:200, 1:500 and 1:1000 at 5.5° C. A dramatic increase in the permeability followed by a sharp decrease was observed with increasing concentration of protein as shown in FIG. 6. In particular, FIG. 6 depicts the effect of increasing AqpZ concentrations on the permeability of ABA polymers. FIG. 6(a) depicts light scattering results normalized to fit between 0 and 1. Curves for different ratios have been offset for clarity and fits are shown as guides. Data at 0 AqpZ:ABA ratio is shown at a fixed offset. FIG. 6(b) shows an increase in calculated permeability with increase in protein to polymer ratio. At a ratio of 1:50 the increase in permeability over pure polymer vesicles is approximately 3000 times.

It is to be understood that the present disclosure herein may be practiced other than as specifically described. Thus, the present embodiments should be considered in all respects as illustrative and not restrictive. Accordingly, it is intended that such changes and modifications fall within the scope of the present disclosure as defined by the claims appended hereto.

What is claimed is:

1. A method comprising
providing a film of amphiphilic molecules with specific functional groups at a liquid air interface of water;
injecting in the water recombinant Aquaporin or a synthetic mimic thereof having a complementary functional group to the specific functional groups of the amphiphilic molecules;
injecting in the water a block copolymer solubilized in detergent;
removing the detergent and allowing the Aquaporin or synthetic mimic and block copolymer to arrange themselves into a substantially flat Aquaporin-Z/block copolymer configuration on a water side of the film of amphiphilic molecules;
detaching the film of amphiphilic molecules from the Aquaporin or synthetic mimic/block copolymer configuration; and
irradiating the Aquaporin or synthetic mimic/block copolymer configuration with UV irradiation in solution to crosslink the polymer.

2. The method of claim 1, wherein the block copolymer is a crosslinkable ABA block or graft polymer with methacrylate end groups that is dissolved in a detergent before injecting the block copolymer in water.

3. The method of claim 1, wherein the recombinant Aquaporin or a synthetic mimic thereof and the block copolymer solubilized in detergent are injected in the water together as a mixture.

4. The method of claim 1, wherein the block copolymer comprises a poly(2-methyloxazoline)-block-poly(dimethylsiloxane)-block-poly(2-methyloxazoline) (PMOXA-PDMS-PMOXA) block polymer.

5. The method of claim 4, wherein the block copolymer comprises $PMOXA_{15}$-$PDMS_{110}$-$PMOXA_{15}$.

6. The method of claim 1, wherein a molar ratio of injected Aquaporin or synthetic mimic to injected block copolymer is between 0.1:1 and 10:1.

7. The method of claim 1, wherein a molar ratio of injected Aquaporin or synthetic mimic to injected block copolymer is about 1:1.

8. The method of claim 1, wherein the detergent removing is performed by a method selected from the group consisting of slow detergent removal using polymer absorbent beads, dialysis, and cyclodextrin addition.

9. A method comprising
providing on a liquid an amphiphilic lipid or copolymer template film having specific functional groups on a liquid;
inserting a water transport protein or a synthetic mimic in the liquid below the amphiphilic copolymer with a tag or molecule that provides specific attachment to the specific functional group on the template film;
inserting in the liquid a block or graft copolymer solubilized in detergent;
removing the detergent such that block copolymer arranges around the water transport protein or synthetic mimic and binds in a substantially flat configuration; and
separating the amphiphilic copolymer, leaving a substantially flat film comprising the water transport protein or a synthetic mimic and block copolymer.

10. The method of claim 9, wherein separating the amphiphilic copolymer is performed by exposing the amphiphilic copolymer to a molecule that breaks the specific interaction between the template film and the substantially flat film comprising the water transport protein or a synthetic mimic and block copolymer.

11. The method of claim 8, further comprising cross-linking the block copolymer.

12. The method of claim 11, wherein the crosslinking is performed by a method selected from the group consisting of electromagnetic radiation, temperature, chemical reactions, and irradiating the film with UV irradiation.

13. A composition comprising
at least one active ingredient; and
vesicles comprising a block or graft copolymer and a water transport protein or synthetic mimic surrounding said active ingredient.

14. A method comprising
Administering to a patient a composition comprising at least one active ingredient; and vesicles comprising a block or graft copolymer and a water transport protein or synthetic mimic; wherein said vesicles surround said active ingredient.

* * * * *